Jan. 9, 1968   W. J. FEYERHERM   3,362,419
CABLE SPLICING UMBRELLA

Filed March 25, 1966   2 Sheets-Sheet 1

INVENTOR
W. J. FEYERHERM
BY Leo Stanger
ATTORNEY

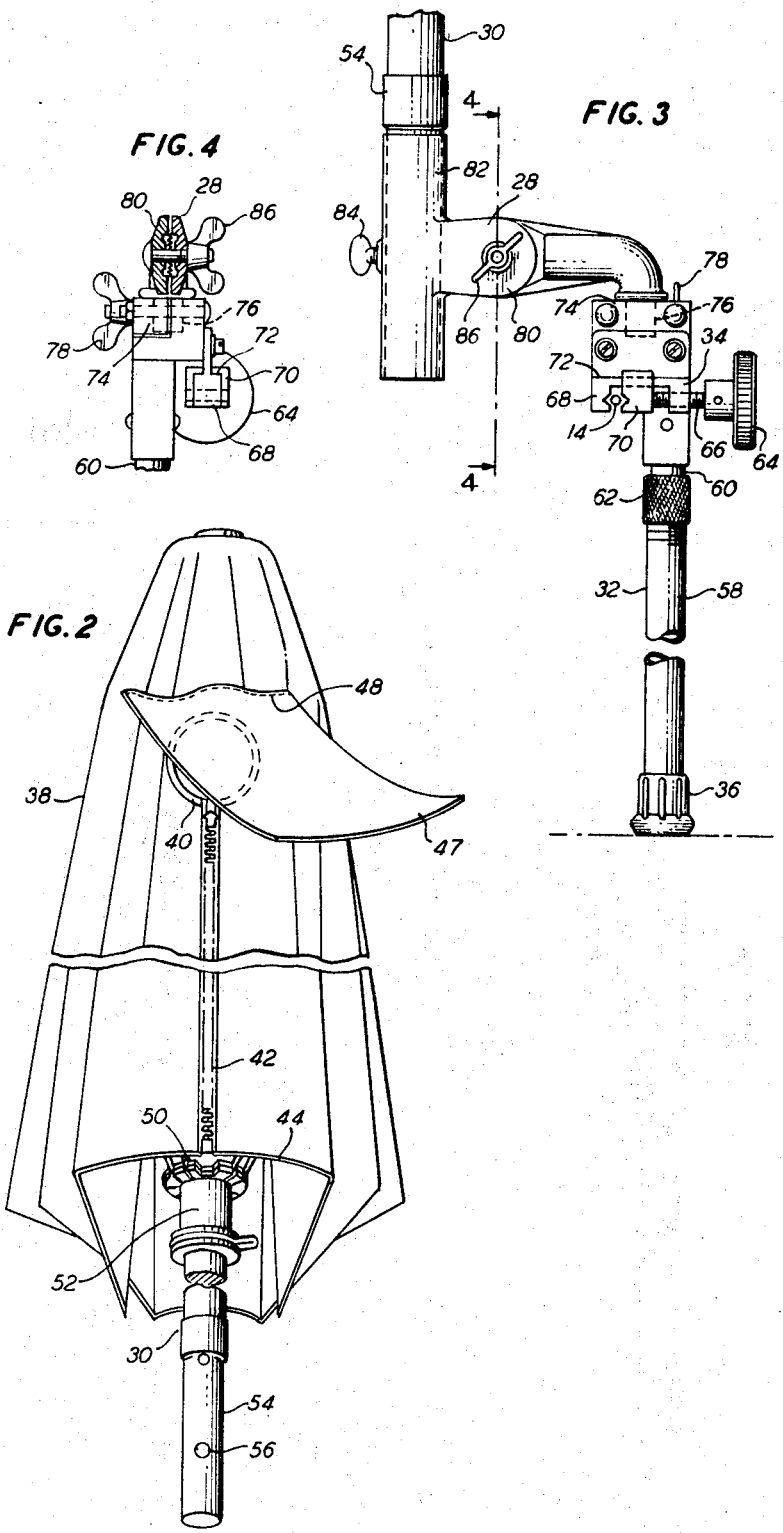

United States Patent Office 3,362,419
Patented Jan. 9, 1968

3,362,419
CABLE SPLICING UMBRELLA
Willard J. Feyerherm, San Diego, Calif., assignor to American Telephone and Telegraph Company, New York, N.Y., a corporation of New York
Filed Mar. 25, 1966, Ser. No. 537,364
5 Claims. (Cl. 135—20)

This invention relates generally to maintenance equipment for current-carrying aerial cables, and particularly to umbrellas mountable with a so-called splicing platform that hangs from the cable and carries the maintenance personnel.

Such umbrellas generally comprise a spreadable canopy topping a staff. They are used by lashing the staff to the upright of a ladder or pole on which the personnel ascend to the platform. As such the umbrellas are capable of shading the personnel on the platform during their repair or splicing of the cable. However, the umbrellas fail to furnish other desirable protection. In particular they fail at deflecting wind, rain and dust from the personnel, from the valuable components in an exposed cable and from the flames on the splicing torches frequently used to open and close cables. This failure stems in part from the unsuitability of the hanging platform for safely and securely supporting an umbrella. This insecurity is especially evident where the umbrella position must be shifted with changes in wind direction.

Quite apart from the security with which such umbrellas can be held by the platform, such umbrellas are deficient in their inability to be moved into all desired wind deflecting positions on a splicing platform. This is due, for example, to the fact that the main support for the platform, namely a support strand forming part of the aerial cable, constitutes an obstruction that prevents such umbrellas from being shifted to deflect winds travelling axially along the cable. Such winds blow away flames on soldering torches. They cool the hot solder necessary for closing cable openings and cable splices to the point where it does not flow properly into all interstices and thereby fails to seal the splice from future contamination. They drive rain into cable openings that expose pulp insulated wires.

An object of the present invention is generally to improve umbrellas for use with suspended cable-splicing platforms.

A more particular object is to improve them by extending their usefulness in protecting equipment and personnel from the undesirable effect of wind, rain and wind-borne particles.

Another object is to stabilize the umbrellas and increase the safety with which personnel on the platform work.

Still another object is to expand the direction in which such an umbrella is effective for deflecting wind, rain or wind-borne dust.

Yet another object of the invention is to protect the solder torches used on the cable from winds travelling axially along the cable despite the existence of the obstructing aerial strand.

According to this invention these ends are achieved by securing the umbrella staff to the cable strand and providing the umbrella canopy with a zippered slit starting at the canopy edge and terminating, near the canopy crown, in a hole through which the cable and a cable strand can fit. Preferably, the umbrella staff includes two portions joined with a universal joint so that the umbrella canopy can be tilted in all directions and so that if protection is desired from the axial direction along the cable the workmen need merely open the zipper and slide the canopy over the cable and supporting strand until the latter pass through the hole, and then zipper the slit. The zippered hole forms holding means that secure the canopy in a position suitable for blocking wind and other contaminates approaching axially along the cable thereby protecting the cable area on which work is being done. The invention thus, instead of avoiding the obstructing strand, uses it. Preferably, a flap secured by its one edge onto the canopy covers the hole when the canopy tilts in directions other than to protect the splie from winds along the cable.

These and other features of the invention are pointed out in the claims. Other objects and advantages of the invention will become obvious from the following detailed description when read in light of the accompanying drawing wherein:

FIG. 2 is a perspective view of the umbrella in FIG. 1 with its canopy collapsed;

FIG. 3 is an elevation of a portion of the staff on the umbrella in FIG. 1; and

FIG. 4 is a section 4—4 of a portion of the umbrella staff illustrated in FIG. 3.

Figure 1:
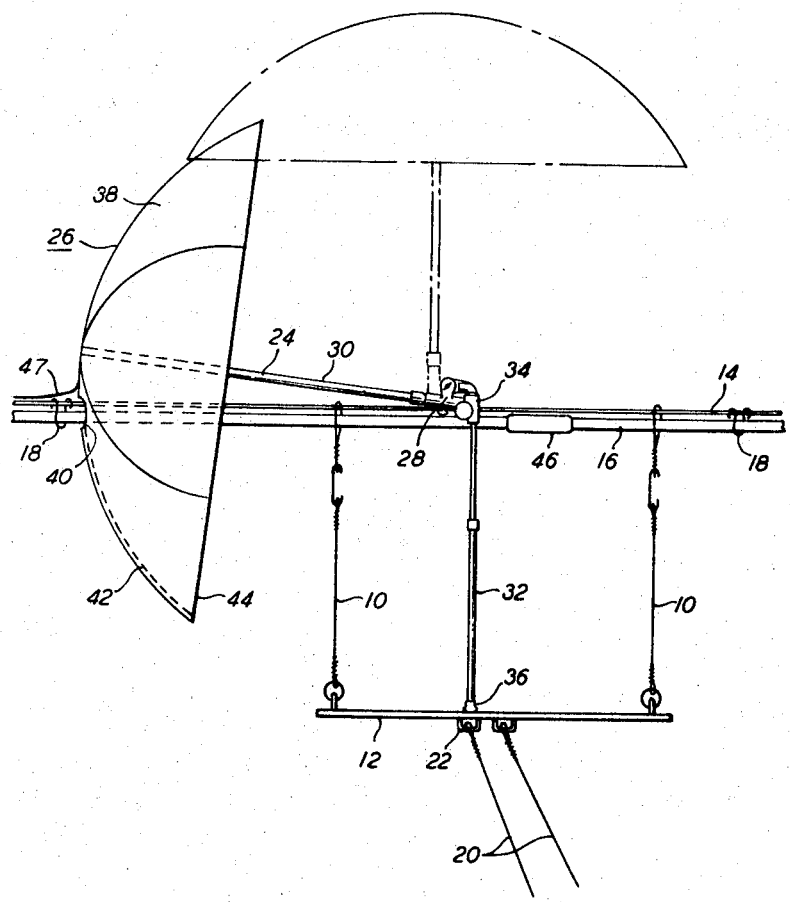
FIG. 1 is an elevation illustrating an umbrella, embodying features of the invention and mounted to a splicing platform suspended from an aerial cable.

In FIG. 1 saddle ropes 10 suspend a splicing platform 12 from a support strand 14 to which an aerial cable 16 is tied by means of support wires 18. The strand 14 may be considered part of cable 16. A splicer places and adjusts the platform 12 and climbs to it by means of a nearby ladder or telephone pole. Guy ropes 20 holding onto guy rings 22 on the near and far side of the platform as shown in FIG. 1 are secured to the nearby ladder or pole for the purpose of stabilizing the platform 12. A handle 24 of an umbrella 26 is divided by an adjustable mounting 28 into a top staff 30 and a telescoping stabilizing leg 32. A clamp 34 secures the stabilizing leg 32 to the strand 14. A rubber tip 36 at the bottom of the leg 32, which the telescoping action of the leg forces into firm engagement with the platform 12, secures the stabilizing leg 32 in upright position. The adjustable mounting 28 permits the staff portion 30 to swivel about wide angles in the vertical plane and 360 degrees in the horizontal plane. As shown in FIG. 1 a canopy 38 of the umbrella 26 tilts so that the reinforced edges of a hole 40 surround both the cable 16 and the strand 14. A zipper 42 extending from the hole 40 to the edge 44 of the canopy 38 may be opened to place the canopy about the strand 14 and cable 16. As shown in FIG. 1 the canopy is placed to prevent wind and rain approaching from the left, axially along the cable 16, from adversely affecting the work upon a splice 46.

If the wind approaches from another direction the zipper 42 may be opened and the canopy 38 released. Turning the staff portion 30 about the adjustable mounting 28 places the canopy 38 in any desired position thereby obstructing wind, rain, sediment or other detrimental deposits from affecting the splice 46 or the operation upon the splice.

FIG. 2 illustrates a portion of umbrella 26 with the canopy 38 folded and with the staff portion 30 disengaged from the adjustable mounting 28. The zipper 42 starting from the edge 44 terminates at the hole 40 whose edges have beein reinforced. A flap 47 secured by stitching 48 covers the hole 40 when the latter does not surround the cable 16 and strand 14. Both the flap 47 and the canopy 38 are made from suitable material such as heavy canvas, nylon or plastic. The usual braces 50 extending from a sleeve 52 operate the canopy 38. A metal tip 54 having a hole 56 in line with the zipper opening or the zipper 42 terminates the staff 30.

FIG. 3 illustrates in detail portions of the handle 24 including the adjustable mounting 28 and C-clamp 34 as well as the stabilizing leg 32. The stabilizing leg is composed of two telescoping sections 58 and 60 secured in relative position by a knurled and interiorly threaded sleeve 62. A knob 64 turns a bolt 66 that opens and closes the jaws 68 and 70 of the C-clamp 34 to hold the strand 14. The jaw 70 rides along a rail 72.

The adjustable mounting 28 comprises a pair of jaws 74 which grasp and release a shaft 76 on the basis of the tightness with which they are held by a wing nut 78. When loosened the jaws permit the shaft 76 to rotate 360 degrees so that a swivel 80 secured to the shaft 76 can rotate 360 degrees about the shaft axis. A better view of the jaws 74, the wing nut 78 and the swivel 80 is available from FIG. 4. The swivel 80 includes a sleeve 82, as shown in upright position, that receives the tip 54 on the staff 30. A thumb screw 84 passing through a hole that has been threaded engages the hole 56 in the tip 54 so as to hold the canopy in a desired position.

Splicers using the umbrella may do so by hoisting the umbrella onto the platform 14 and securing the clamp 34 to the strand 14 with the knob 64. They then extend the telescoping stabilizing leg 32 by loosening the sleeve 62 until the rubber tip 36 jams onto the platform 12. Preferably, the workmen clamp the stabilizing leg 32 as close as possible to the work place such as the splice 46. During this operation the staff 30 may either have been inserted in the sleeve 82 or the staff 30 and canopy 38 can be lying on the platform. If the latter is the case the workmen now pass the tip 54 through the sleeve 82 and turn the staff 30 until they are able to pass the thumb screw 84 through the hole 56. The screw 84 is then tightened. The workmen open the umbrella, and by loosening the wing nut 86 on the swivel 80 and the wing nut 78 on the jaws 74 points the canopy in the direction of oncoming detrimental affects such as wind, rain or sand. The position can then be secured by tightening the nuts 86 and 78. If the workmen need shading or the splice 46 needs protection from a downpour of rain the canopy may take the position shown in phantom lines in FIG. 1.

If, however, a wind direction or rain, or dust, approaches from an axial direction splicers use the umbrella by opening the zipper 42 prior to spreading the canopy and while or after spreading the canopy close the zipper so that the cable 16 and strand 14 pass through the hole 40 as shown in FIG. 1. This, of course, involves loosening the wing nuts 78 and 86 so that the staff 30 and canopy 38 can be pivoted into position. When the canopy is spread, or during spreading of the canopy, the zipper 42 can be closed thereby securing the canopy in proper position.

Umbrellas according to the invention afford protection not only for the workmen repairing the cable or for a splice in the cable, but also for the cable and cable equipment itself. It protects the interior of the splice from contaminates. It prevents extinction of soldering torches for heating solder that must frequently be applied to opened and closed splices. This is of critical importance in cables exposed to the elements where failure of molten solder to flow into interstices can result in ultimate destruction of the cable.

While an embodiment of the invention has been described in detail it will be obvious to those skilled in the art that the invention may be embodied otherwise without departing from its spirit and scope.

What is claimed is:

1. An umbrella in combination with a splicing platform suspended from an aerial cable strand comprising a canopy, post means for supporting said canopy, means on said post means for expanding said canopy, securing means on said post means for attaching said post means to said cable strand, said post means being mounted in the center of said canopy, holding means for maintaining said canopy in a fixed position relative to said cable strand and including a portion of said canopy having a slot running from the outer edge of said canopy toward said post means to receive said cable strand therethrough, and closure means on said canopy for opening and closing said slot to hold said canopy to said cable strand.

2. An umbrella as in claim 1 wherein said post means includes along its length a universal joint between said clamp means and said means for expanding said canopy for orienting said canopy in any direction relative to said strand.

3. An umbrella as in claim 1 wherein the portion of said canopy included in said holding means has an aperture at the end of said slot.

4. An umbrella as in claim 2 wherein said post means on the side of said universal joint remote from said canopy includes a telescoping leg extending downwardly from said clamp means for engaging said splicing platform and stabilizing said clamp means universal joint and center post.

5. An umbrella as in claim 3 further comprising a flap secured to the outside of said canopy for covering said aperture.

References Cited
UNITED STATES PATENTS

| | | | |
|---|---|---|---|
| 504,900 | 9/1893 | Barnes | 135—21 |
| 923,596 | 6/1909 | Staples. | |
| 970,751 | 9/1910 | Pranke. | |
| 2,001,623 | 5/1935 | Montgomery. | |
| 2,166,562 | 7/1939 | Staley. | |
| 2,306,706 | 12/1942 | Lucas | 135—20 |
| 2,559,421 | 7/1951 | Garrett | 135—46 |
| 2,809,649 | 10/1957 | Druck | 182—129 |
| 2,864,389 | 12/1958 | Smith et al. | |
| 3,032,047 | 5/1962 | Wendorf. | |

DAVID J. WILLIAMOWSKY, *Primary Examiner.*

PETER M. CAUN, *Examiner.*